April 7, 1925.
T. MONTOYA
WHEELED CULTIVATOR
Filed Oct. 26, 1923
1,532,331
3 Sheets-Sheet 3
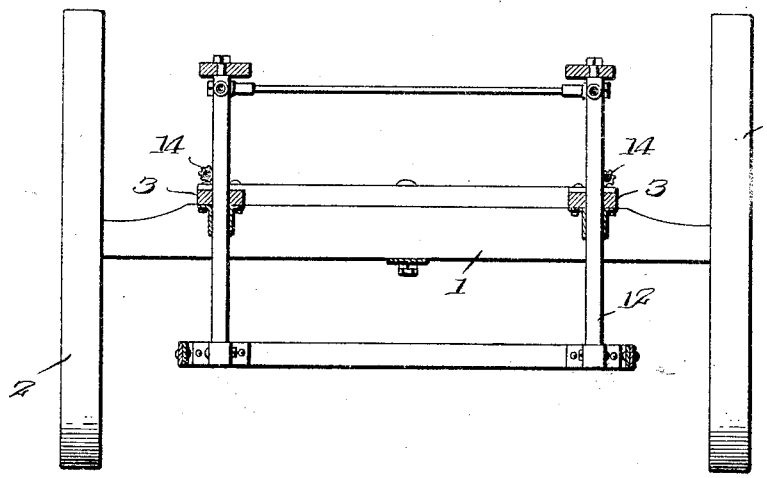
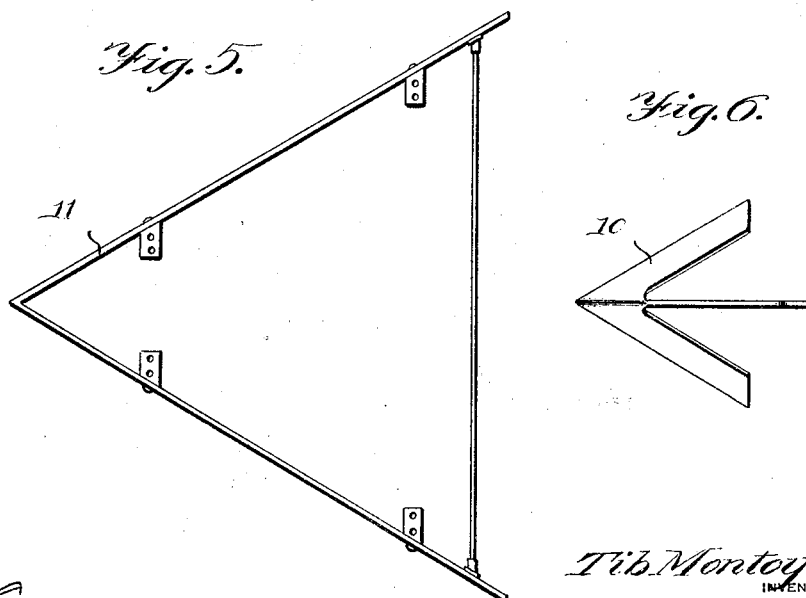

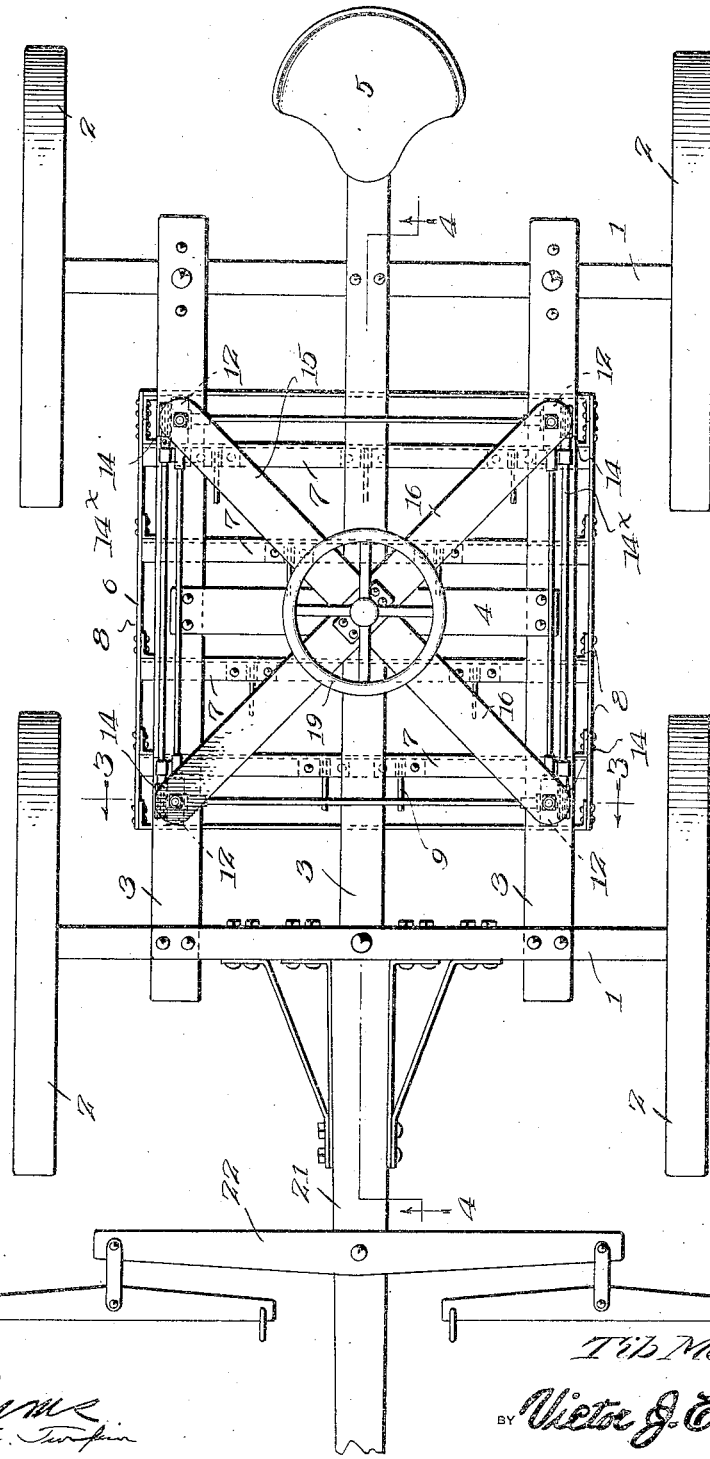

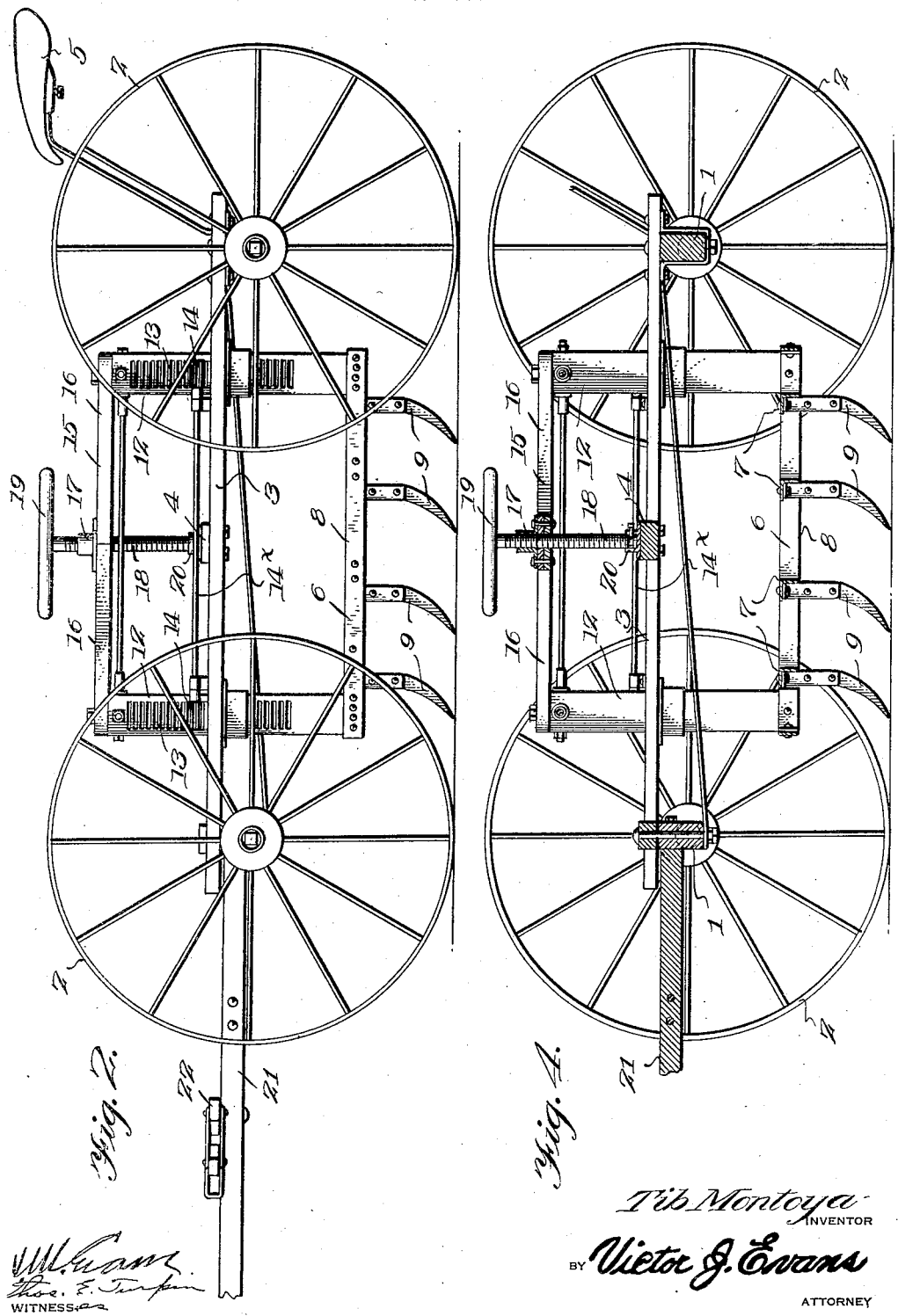

Patented Apr. 7, 1925.

1,532,331

UNITED STATES PATENT OFFICE.

TIB MONTOYA, OF EL VALLE, NEW MEXICO, ASSIGNOR OF ONE-HALF TO J. C. GALLEGOS, OF ESPANOLA, NEW MEXICO.

WHEELED CULTIVATOR.

Application filed October 26, 1923. Serial No. 670,978.

*To all whom it may concern:*

Be it known that I, TIB MONTOYA, a citizen of the United States, residing at El Valle, in the county of Taos and State of New Mexico, have invented new and useful Improvements in Wheeled Cultivators, of which the following is a specification.

The object of my said invention is the provision of a wheeled cultivator designed more particularly for cultivating alfalfa and also adapted to be used to advantage as a ground leveling apparatus and as a weed pulling apparatus, the said cultivator being characterized by a member for carrying the ground engaging means, and the said member being susceptible of being manually raised and lowered so as to determine the depth to which the ground will be worked or the point at which the ground will be engaged.

Other objects and practical advantages of the invention will be fully understood from the following description and claims when the same are read in connection with the drawings, accompanying and forming part of this specification, in which:—

Figure 1 is a top plan view of the wheeled cultivator constituting the preferred embodiment of my invention, the said embodiment having been reduced to actual practice and successfully operated in the United States.

Figure 2 is a side elevation of the cultivator.

Figure 3 is a vertical transverse section of the cultivator taken in the plane indicated by the line 3—3 of Figure 1.

Figure 4 is a longitudinal vertical section taken in the plane indicated by the line 4—4 of Figure 1.

Figures 5 and 6 are detail views hereinafter explicitly referred to.

Similar numerals of reference designate corresponding parts in all of the views of the drawings.

Among other elements my novel cultivator comprises front and rear axles 1 on which are mounted ground wheels 2. Arranged upon and fixed to the axles 1 and disposed adjacent to the ground wheels are frame bars 3. It will also be noted that a frame bar 4 is arranged transversely upon and appropriately connected to the bars 3. At 5 is a driver's seat connected with and supported by the rear axle 1.

Disposed below the frame formed by the axles 1 and frame bars 3 and 4 is a vertically adjustable frame 6 for carrying the devices for engaging or working the ground. As illustrated the said frame 6 is made up of a plurality of bars 7 and end connections 8 which end connections of course may be of any type compatible with the purpose of my invention. The bars 7 of the vertically adjustable frame 6 may be equipped with teeth 9 for cultivating ground planted in alfalfa or may be equipped with ground working members 10, Figure 6, for use in pulling weeds, it being understood of course that the teeth 9 and the members 10 are to be used interchangeably. I would also have it understood that my invention contemplates the employment of a V-shaped drag 11, Figure 5, which drag is designed to be connected to and suspended from the vertically movable frame 6 and this irrespective of whether the frame 6 is at that time provided with teeth 9 or members 10 or is minus teeth 9 or members 10 or implements of any other description.

Appropriately guided in the outer frame bars 3 are vertically movable bars 12 of which four are employed. The said vertically movable bars 12 are provided with racks 13, and it will be noted that rotary pinions 14 are intermeshed with the said racks 13, the said pinions 14 being on shafts $14^x$, connected with the frame formed by the bars 3 as illustrated and being designed in cooperation with the said racks 13 to equalize the raising and lowering of the vertically movable frame 6 to which frame 6 the bars 12 are properly connected at the lower ends of the said bars. The upper ends of the bars 13 are connected to an X-frame 15 disposed horizontally above the frame bars 3 and 4. The X-frame 15 which is preferably formed by two crossed bars 16 fixedly connected together at the point of intersection, is provided at its center with a nut 17 properly fixed to the frame 15. The connection between the ends of the crossed bars 16 and the upright vertically movable bars 12 may be effected in any manner compatible with the purpose of my invention, though I prefer to employ the construction illustrated.

Threaded through and engaging the nut 17 of the frame 15 is an upright rotary shaft 18, equipped at its upper end with a hand wheel 19. The lower end of the said shaft 18 is journaled in and supported by an apertured bearing 20 in the frame member or bar 4.

As herein illustrated my novel cultivator is designed to be drawn by draft animals and is therefore equipped as illustrated with an appropriate tongue 21 and doubletree 22. I desire it distinctly understood however that my novel cultivator may be fitted for connection with and movable by a tractor without involving departure from the scope of my invention as defined by my appended claims.

As hereinbefore indicated, my novel cultivator is designed to be used primarily for cultivating ground or harrowing ground in which alfalfa is planted, the frame 6 at that time being equipped with teeth such as 9, and the said frame 6 being adjusted vertically and adjustably fixed through the medium of the shaft 18 to position the teeth 9 for operation to the best advantage in the ground. When it is designed to pull weeds, the teeth 9 are removed from the frame 6, and weed pulling members 10 are connected to the bars 7 of the frame 6, after which the frame 6 is adjusted vertically and adjustably fixed for the positioning of the weed pullers 10 to the best advantage.

The ground leveling device 11 is of a general V-shape and is arranged in operation with its apex foremost so as not to unduly increase the labor of the draft animals incident to traverses of the cultivator. As best indicated the device 11 is connected with and suspended from the frame 6 and may, in the discretion of the farmer, be connected with the frame 6 when the said frame 6 is with or without teeth 9 or weed pulling members 10.

It will be apparent from the foregoing that my novel cultivator notwithstanding the facility with which adjustment may be effected, and the facility with which changes of implements may be accomplished, is simple and inexpensive in construction, and is well adapted to withstand the rough usage and exposure to which agricultural machinery is ordinarily subjected.

While I have not specified the materials of which the different parts of my novel cultivator are formed, I desire it understood that in the preferred embodiment of my invention some of the said parts are formed of wood and others are formed of metal.

I have entered into a detailed description of the construction and relative arrangement of the parts embraced in the present and preferred embodiment of my invention in order to impart a clear, full and exact undesrstanding of the said embodiment. I do not desire however, to be understood as confining myself to the stipulated construction and relative arrangement of elements inasmuch as in the future practice of the invention such changes or modifications may be made as fairly fall within the scope of my invention as defined by my appended claims.

Having described my invention what I claim and desire to secure by Letters-Patent is:—

1. A wheeled cultivator comprising a wheel supported frame with guideways therein, a frame movable vertically relative to the wheel supported frame and having upright bars disposed in and movable through said guideways, a frame carried at the lower ends of said upright bars of the vertically movable frame and adjustable therewith and equipped with means for engaging the ground; the said vertically movable frame having crossed bars fixedly connected at their ends to the said upright bars thereof, a nut fixed to and carried by said crossed bars at the point of intersection, and an upright threaded shaft extending through and engaging the thread of said nut and provided at its upper end with a handle and having its lower end journaled in and supported by a bearing on the wheel supported frame.

2. In a wheeled cultivator, the combination of a wheel supported frame provided with vertically disposed guideways at points adjacent to its forward and rear ends, a vertically movable frame having a crown portion and also having upright bars dependent from said crown portion and disposed in and movable through the said guideways of the wheel supported frame, ground engaging means connected with the lower ends of said upright bars, racks on said upright bars, rotary gears carried by the wheel supported frame and intermeshed with said racks, a nut carried by the crown portion of the vertically movable frame, and a shaft threaded through the said nut and provided above the vertically movable frame with a handle and having its lower end journalled in and supported by a bearing carried by the wheel supported frame, said gears being carried in pairs on shafts on the wheel-supported frame.

3. In a cultivator, the combination of a frame, a frame guided by and bodily movable up and down relative to the first-named frame and equipped with means for engaging the ground, cooperating means on said frames at several points for the bodily raising and lowering of the second-named frame, and manually operable means connected with the said means on the first-named frame for the vertical adjustment and adjustable fixing of the second-named frame.

In testimony whereof I affix my signature.

TIB MONTOYA.